United States Patent
Nicodeme

[15] 3,699,513
[45] Oct. 17, 1972

[54] WARNING DEVICE FOR A SPLIT FLUID PRESSURE BRAKING SYSTEM

[72] Inventor: Philippe Nicodeme, Louveciennes, France

[73] Assignee: The Bendix Corporation, South Bend, Ind.

[22] Filed: July 15, 1971

[21] Appl. No.: 162,772

[52] U.S. Cl. ................................340/52 C, 200/82
[51] Int. Cl. ........................B60q 1/00, H01h 35/38
[58] Field of Search.............340/52, 52 B, 52 C, 60; 200/82, 83

[56] References Cited

UNITED STATES PATENTS

| | | |
|---|---|---|
| 3,011,595 | 12/1961 | Heiss et al. ..............340/52 C |
| 3,423,727 | 1/1969 | Adamson.................340/52 C |
| 3,439,322 | 4/1969 | Gardner...................340/52 C |

Primary Examiner—Alvin H. Waring
Attorney—Leo H. McCormick, Jr.

[57] ABSTRACT

A warning device for a split fluid pressure braking system, comprising a first single switch controlling the activation of stop lights of a vehicle upon build-up of pressure in at least one of the sub-system, and a second single switch controlling the activation of a warning signal device upon a differential of pressure between the two braking sub-systems.

2 Claims, 1 Drawing Figure

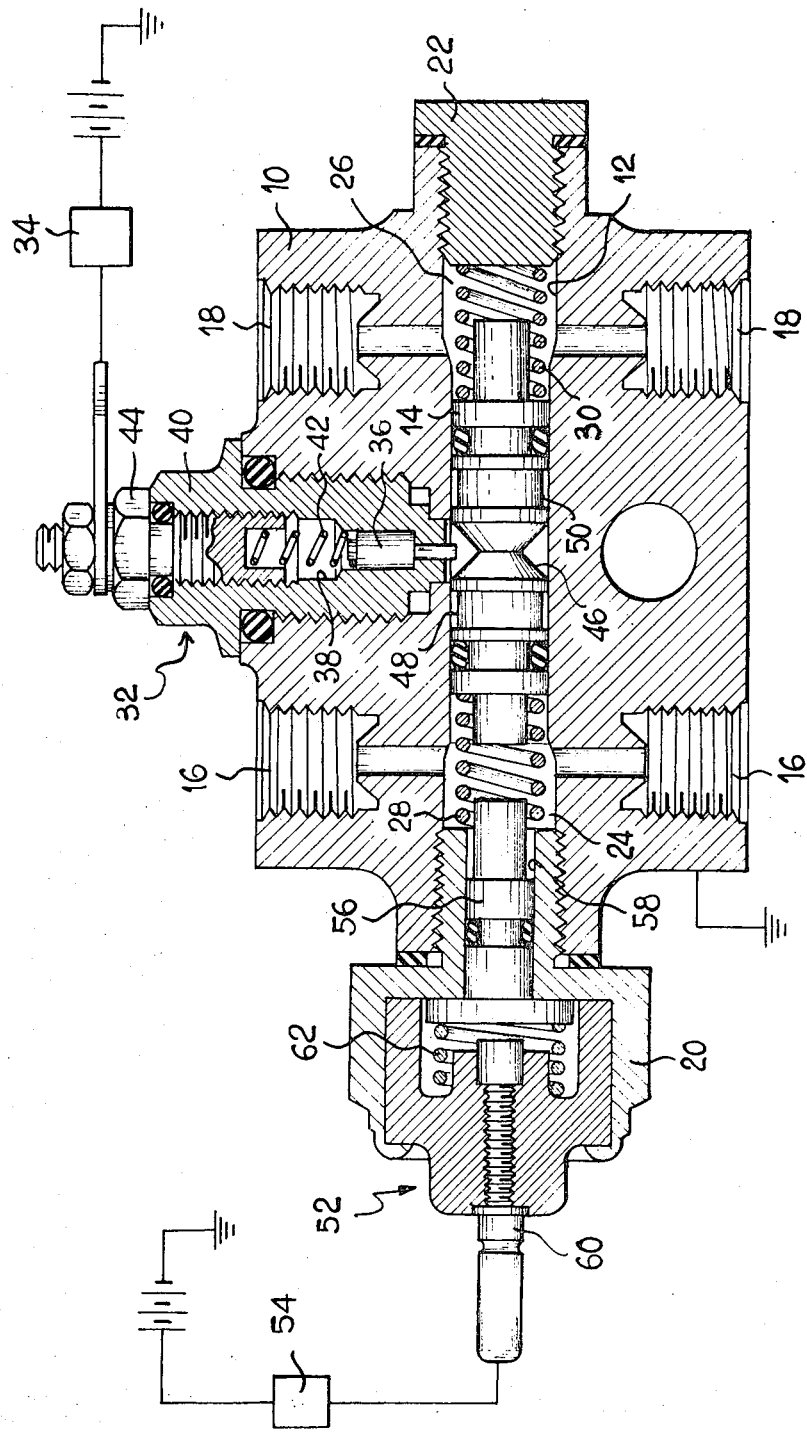

WARNING DEVICE FOR A SPLIT FLUID PRESSURE BRAKING SYSTEM

This invention relates to a waring device for a split fluid pressure braking system adapted to activate stop lights of a vehicle upon build-up of pressure in at least one of the braking subsystems and to warn the operator of the vehicle of a failure of one of the braking subsystems.

It has been proposed a warning device comprising a stop light controlled by first switch means actuated in response to pressurization of at least one of the two independent sub-systems of the braking system and a failure signal device controlled by second switch means actuated in response to displacement away from a normal position of a movable piston sealingly slidable in a bore to define therein two opposed fluid chambers connected to the two independent braking sub-systems respectively.

In such a warning device, first switch means generally comprises two single switches respectively responsive to two independent braking pressures and electrically arranged in parallel to close the electrical circuit of activation of the stop lights during braking period.

According to the invention, said first switch means is actuated by a movable piston means responsive on the one hand to the fluid pressure to one of said fluid chambers and on the other hand to an abnormal displacement of said movable piston inwardly the said one fluid chamber as a result of a failure in the braking sub-system connected thereto.

It should be understood that with such a feature, the warning device is simple and cheap since manufacturers might prevent the cost of one single switch.

Other features of the invention will appear in the following description taken in reference with the accompanying drawings in which the unique FIGURE represents a warning device for split fluid pressure braking system illustrated in a cross-sectional view.

As shown in the drawing, a housing 10 is provided with a central bore 12 wherein is sealingly mounted a movable control piston 14. Two end caps 20,22 are sealingly screwed on the housing 10, thereby defining a bore 12 two pressure chambers 24 and 26 at each side of the movable piston 14. Two couples of inlet ports 16, 18 separately connected to two independent hydraulic braking sub-systems (not shown) respectively communicate with chambers 24,26. Two preloaded springs 28, 30 respectively abutting caps 20 and 22 yieldably urge piston 14 towards a central rest position illustrated in the drawing.

A first switch means 32 is mounted in the housing 10 to control the activation of a signal device 34 of any type known, upon a loss of pressure in either of chambers 24 and 26. In the described embodiment switch means 32 comprises a metallic plunger 36 slidably mounted in the central bore 38 of a sleeve made of insulating material and secured on housing 10. The plunger 36 electrically connected by spring 42 to a terminal 44 controlling the signal device 34 cooperates with a caming surface 46 provided on piston 14. In the event of a differential of pressure between chambers 24 and 26 the piston 14 shifts towards the lower pressure chamber thereby plunger 36 engages caming surface 46 of piston 14. Then, since the housing is grounded and the piston 14 is made in conductive material, the electrical path permitting the activation of signal device 32 is closed.

As shown in the drawing, piston 14 also comprises two annular grooves 48 and 50 adapted to cooperate with plunger 36 thereby locking piston 14 in a off-centered position since a sufficient differential of pressure appeared for activating the signal device 32.

According to the invention, second switch means 52 are disposed on cap 20 thereby controlling the activation of stop light 54 upon the pressure build-up in either of the braking sub-systems connected to chambers 24 and 26. Switch means 52 comprises another metallic plunger 56 sealingly slidable in a bore 58 provided in cap 20 and a screw 60 defining an electrical terminal connected to stop light 54. Furthermore a preloaded spring 62 urges plunger 56 inwardly chamber 24 thereby disengaging plunger 56 from terminal 60.

When the vehicle's operator depresses its brake pedal to activate the braking system, the pressure is built up in chambers 24,26. Then the plunger 56 responsive to the pressure maintained in chamber 24 shifts against the load of spring 62 until abutting terminal 60 to close the electrical circuit energizing stop light 54. In the event of failure of braking pressure in the sub-system connected to chamber 26, since braking pressure remains in chamber 24, stop light 54 is still activated. Furthermore in the event of failure of braking pressure in the sub-system connected to chamber 24, since the piston 14 is shifted towards the lower pressure chamber, i.e., chamber 24, piston 14 will abut plunger 56 and urge the latter in engagement with terminal 60 thereby reactivated stop light 54.

It should be noted that the distance between plunger 56 and piston 14 is longer than the distance between plunger 36 and left wall of groove 50 when considering the FIGURE thereby the release of pressure in chambers 24 and 26 causes the plunge. 56 to disengage from terminal 60 for opening the electrical circuit of signal device 54, even if piston 14 is locked in an off-centered position.

I claim:

1. A warning device for a split fluid pressure braking system comprising a stop light controlled by first switch means actuated in response to pressurization of at least one of the two independent sub-systems of the braking system and a failure signal device controlled by second switch means actuated in response to displacement away from a normal position of a movable piston sealingly slidable in a bore to define therein two opposed fluid chambers connected to the two independent braking sub-systems respectively, said first switch means being actuated by a movable piston means responsive on the one hand to the fluid pressure in one of said fluid chambers and on the other hand to an abnormal displacement of said movable piston inwardly the said one fluid chamber as a result of a failure in the braking sub-system connected thereto.

2. A warning device according to claim 1 wherein said piston means is comprised of a plunger sealingly slidable in said one fluid chamber substantially coaxially with said movable piston to be engaged thereby for actuating said first switch means in the event of a failure in the braking sub-system connected to said one fluid chamber.

* * * * *